(12) United States Patent
Fujinami et al.

(10) Patent No.: US 9,825,572 B2
(45) Date of Patent: Nov. 21, 2017

(54) ELECTRIC WORKING MACHINE

(71) Applicant: MAKITA CORPORATION, Anjo-shi, Aichi (JP)

(72) Inventors: Katsuhito Fujinami, Anjo (JP); Kazuki Iyota, Anjo (JP)

(73) Assignee: MAKITA CORPORATION, Anjo-shi (JP)

(*) Notice: Subject to any disclaimer, the term of this patent is extended or adjusted under 35 U.S.C. 154(b) by 57 days.

(21) Appl. No.: 15/008,841

(22) Filed: Jan. 28, 2016

(65) Prior Publication Data

US 2016/0241178 A1 Aug. 18, 2016

(30) Foreign Application Priority Data

Feb. 16, 2015 (JP) .................................. 2015-027804

(51) Int. Cl.
| | |
|---|---|
| *B25D 15/00* | (2006.01) |
| *H02P 3/00* | (2006.01) |
| *H02P 23/02* | (2006.01) |
| *H02K 11/26* | (2016.01) |
| *H02K 11/27* | (2016.01) |
| *H02P 7/295* | (2016.01) |

(52) U.S. Cl.
CPC .............. *H02P 23/02* (2013.01); *H02K 11/26* (2016.01); *H02K 11/27* (2016.01); *H02P 7/295* (2013.01)

(58) Field of Classification Search
CPC ............ H02P 23/02; H02K 11/26; H02K 5/04

USPC ................ 318/430–434, 442, 450, 459, 474, 318/478–479, 500, 504
See application file for complete search history.

(56) References Cited

U.S. PATENT DOCUMENTS

| | | | |
|---|---|---|---|
| 3,234,464 A * | 2/1966 | Cook ................... | G01R 19/155 324/122 |
| 3,596,544 A * | 8/1971 | Pitman ................... | B23Q 15/12 340/680 |
| 4,574,226 A | 3/1986 | Binder | |
| 5,757,162 A * | 5/1998 | Weber ..................... | H02P 25/04 318/531 |
| 6,765,317 B2 * | 7/2004 | Chu ....................... | H02J 7/0068 307/150 |

FOREIGN PATENT DOCUMENTS

JP S60-77694 A 5/1985

* cited by examiner

*Primary Examiner* — Bentsu Ro
(74) *Attorney, Agent, or Firm* — Oliff PLC

(57) ABSTRACT

An electric working machine according to one aspect of the present disclosure includes a motor, a current detector, a voltage detector, and a load state determination unit. The current detector is configured to detect a current flowing through the motor during drive of the motor. The voltage detector is configured to detect an input voltage supplied to the motor during drive of the motor. The load state determination unit is configured to determine whether the motor is in a no-load operation state based on the detected current, the detected input voltage and an output voltage from an electric power source.

7 Claims, 8 Drawing Sheets

ELECTRIC WORKING MACHINE

CROSS-REFERENCE TO RELATED APPLICATIONS

This application claims the benefit of Japanese Patent Application No. 2015-027804 filed Feb. 16, 2015 in the Japan Patent Office, and the entire disclosure thereof is incorporated herein by reference.

BACKGROUND

The present disclosure relates to an electric working machine provided with a motor.

Electric working machines such as electric power tools have been known. In such electric working machines, when a motor is run at no load, driving power of the motor, which is electric power for driving applied to the motor, is reduced to rotate the motor at low speed. When a load is applied to the motor, the driving power of the motor (and driving force of the motor) is increased.

This type of electric working machines are known as described in Japanese Unexamined Patent Application Publication No. S60-77694, for example. This type of electric working machine typically detects a current that flows during drive of the motor. When a value of the current exceeds a specified threshold, it is determined that the motor has changed its operation state from a no-load operation state to a load operation state.

When it is determined that the motor has changed its operation state from the no-load operation state to the load operation state, the electric working machine, for example, increases a driving duty ratio for controlling the current supplied to the motor to increase driving power of the motor, in order to drive a driven object as an external load.

SUMMARY

If a load state of a motor is determined only by a current flowing through the motor as described above, however, it is not possible to correctly determine an operation state of the motor in an environment where a length of a power supply path from an electric power source to an electric working machine is changed.

As illustrated in FIGS. 1A and 1B, when an electric working machine 6 (electric hammer in the figure) is supplied with driving power via a power cord 4 from an electric power source 2 (alternate current (AC) power supply in the figure), a current flows through the power cord 4. Therefore, a voltage drop occurs in the power cord 4.

This voltage drop is dependent on an internal resistance R of the power cord 4 and an input current Iin to the electric working machine 6. The greater the input current Iin is, the greater the voltage drop becomes. When this voltage drop (Iin×R) becomes greater, an input voltage Vin to the electric working machine 6 (and the motor 8) is reduced.

Accordingly, when a cord reel for extension is provided between the electric power source 2 and the electric working machine 6, the input voltage Vin and the input current Iin are reduced, as shown in FIGS. 2A and 2B, both during a no-load operation and a load operation of the motor 8. The cord reel for extension is used, for example, when the power cord 4 pulled out from the electric working machine 6 is short.

If the number of the cord reel for extension is increased from one to two, so as to further extend the power supply path from the electric power source 2 to the electric working machine 6, the input voltage Vin and the input current Iin are further reduced.

The input current Iin during the no-load operation of the motor 8 is different from the input current Iin during the load operation. The input current Iin is greater during the load operation than during the no-load operation.

Thus, there would be no difference in current value, for example, between an input current Iin1 at the time when the motor 8 is run at no-load without using a cord reel and an input current Iin2 at the time when the motor 8 is run at load using two cord reels.

Therefore, when it is possible to change the length of the power supply path from the electric power source to the electric working machine, it is unable to accurately determine whether the motor is run at no-load based only on the current flowing through the motor.

The electric working machine 6 described in FIG. 1A is an impact tool such as an electric hammer. The electric working machine 6 comprises a housing 6a, a pair of grippers 6b that protrude from the housing 6a, and a mount 6c for mounting a tool bit 6d. In the vicinity of the grippers 6b, an operation switch 18 is provided.

In the electric working machine 6, the motor 8 in the housing 6a is driven when the operation switch 18 is operated. Driving force from the motor 8 is transmitted from the motor 8 to the mount 6c (and the tool bit 6d) via a driving force transmission mechanism (not shown) in the housing 6a.

The above-mentioned problem occurs not only to this type of impact tool but to a variety of electric working machines comprising a motor as a driving source.

The above problem also occurs not only to an electric working machine that receives electric power supplied through a power cord from an electric power source but to an electric working machine that receives electric power supplied from a battery to drive a motor.

Repetitive charging and discharging deteriorates a battery and increases its internal resistance. When the internal resistance of the battery is increased, an output voltage from the battery is largely reduced as a discharge current becomes greater.

Therefore, the input current Iin to the electric working machine 6 (and thus the motor 8) is largely different in a case of using a deteriorated battery having a large internal resistance from a case of using a new battery having a small internal resistance.

In the electric working machine that uses a battery as an electric power source, even the length of the power supply path from the electric power source to the electric working machine (in other words, internal resistance) is constant, it is unable to accurately determine the operation state of the motor 8 only by the input current Iin.

In the electric working machine having a motor of the present disclosure, it is desirable to be able to precisely determine the no-load operation state of the motor without receiving an influence of the voltage drop in the electric power source and the power supply path that supply electric power to the electric working machine.

An electric working machine according to one aspect of the present disclosure comprises a housing, a mount, a motor, an operation switch, a current detector, a voltage detector, and a load state determination unit. The mount is configured to mount one of a tool bit and an edged tool for carrying out work to a workpiece. The motor is built in the housing and is configured to be driven by electric power supplied from an electric power source to drive the mount. The operation switch is for driving the motor.

The current detector is configured to detect a current flowing through the motor during drive of the motor in association with an operation of the operation switch. For example, the current detector is configured to detect a current flowing through the motor when the operation switch is operated to drive the motor. The voltage detector is configured to detect an input voltage supplied to the motor during drive of the motor. The load state determination unit is configured to determine whether the motor is in a no-load operation state during drive of the motor, based on the detected values.

Specifically, the load state determination unit is configured to determine whether the motor is in the no-load operation state in which no work is carried out to the workpiece, based on the current detected by the current detector, the input voltage detected by the voltage detector, and an output voltage from the electric power source.

As above, in this disclosure, an operation state of the motor is determined using not only a current Iin detected by the current detector but an input voltage Vin supplied to the motor during drive of the motor and an output voltage Vs from the electric power source. One of the reasons is as follows.

As shown in FIG. 1B, if an internal resistance of the power supply path to the motor 8 is R, the output voltage Vs from the electric power source 2 can be described as the following equation (1), using the current Iin and the input voltage Vin.

$$Vs = Iin \times R + Vin \quad (1)$$

If the internal resistance of the motor 8 itself is Rm, the output voltage Vs from the electric power source 2 can be described by the following equation (2).

$$Vs = Iin \times R + Iin \times Rm \quad (2)$$

The current Iin detected by the current detector is changed by an influence of the internal resistance R of the power supply path to the motor 8. Therefore, the current Iin is converted into a current value I when the internal resistance R is assumed zero (i.e., when not influenced by the internal resistance R).

The reason why the current Iin should be converted into the current value I at the time when the internal resistance R is assumed zero is because the operation state of the motor 8 can be accurately determined from the current value I, without receiving the influence of the internal resistance R of the power supply path.

An arithmetic equation for determining the current value I can be derived using the equation (2).

That is, the current value I when the internal resistance R in the power supply path is assumed zero can be described as the following equation (3) from the above equation (2).

$$I = Vs/Rm \quad (3)$$

The internal resistance Rm of the motor 8 can be described as the following equation (4) from the input voltage Vin and the current Iin flowing through the motor 8.

$$Rm = Vin/Iin \quad (4)$$

By substituting the equation (4) into the equation (3), the current value I can be represented by the following equation (5).

The equation (5) can be utilized as an arithmetic equation for converting the current Iin detected by the current detector to the current value I at the time when the internal resistance R of the power supply path is assumed zero.

$$I = Vs/Vin \times Iin \quad (5)$$

In one aspect of the present disclosure, a parameter for determining the operation state (current value I or an equivalent value thereof) may be acquired in accordance with the arithmetic equation (5). Based on this parameter, it may be determined whether the motor is run at no-load.

As indicated by a dotted line and a dashed line in FIG. 3, when the internal resistance R of the electric power source and the power supply path changes, the current Iin detected by the current detector also changes. Therefore, it is unable to accurately determine whether the motor is run at no-load or at load, based solely on the current Iin.

In contrast, as shown by a solid line in FIG. 3, if the current Iin is converted to the current value I (or a value equivalent to the current I) when the internal resistance R is zero, using the input voltage Vin and the output voltage Vs, it is possible to accurately determine whether the motor is run at no-load.

For example, without influence by the voltage drop caused in the electric power source and the power supply path that supply electric power to the electric working machine, it is possible to accurately determine the no-load operation state of the motor.

The load state determination unit may be configured to correct the current Iin depending on a ratio (Vs/Vin) between the output voltage Vs and the input voltage Vin, in accordance with the arithmetic equation (5), and to determine that the motor is run at no-load when the corrected current value I is equal to or below a preset threshold for no-load determination.

The load state determination unit may be configured to acquire a current I equivalent value from the output voltage Vs, the input voltage Vin and the current Iin, using a map set in advance in accordance with the above arithmetic equation (5), and to determine whether the motor is run at no-load, using the current I equivalent value.

The load state determination unit may utilize a preset fixed voltage as the output voltage from the electric power source. Examples of the preset fixed voltage include a rated output voltage of the electric power source, a specified charging voltage of a battery serving as an electric power source, and so on.

When the drive of the motor is stopped, no current flows through the power supply path. That is, the voltage drop caused by the internal resistance of the power supply path is zero or very small.

Therefore, the load state determination unit may acquire a voltage detected by the voltage detector at the time when the drive of the motor is stopped, as the output voltage from the electric power source.

The operation switch can be provided on a current path closer to the motor than a connecting section to the voltage detector in the current path to the motor in the electric working machine, and configured to complete/interrupt the current path. In this case, the load state determination unit may be configured as follows.

The load state determination unit may be configured to acquire the input voltage from the voltage detector when the operation switch is ON, and acquire the output voltage from the voltage detector when the operation switch is OFF.

The load state determination unit may acquire from an output voltage detector the output voltage from the electric power source. The output voltage detector may be provided in the electric power source, or in the power supply path from the electric power source to the electric working machine.

In one aspect of the disclosure, the electric working machine may comprise a motor control unit that increases driving power of the motor, when it detects that the motor has changed its operation state from no-load operation to load operation based on a determination result of the load state determination unit.

The electric working machine comprising the motor control unit can reduce driving power of the motor when motor is run at no-load to rotate the motor at low speed, and increase the driving power of the motor when a load is applied to the motor to drive a driven object serving as the load.

BRIEF DESCRIPTION OF THE DRAWINGS

Hereinafter, exemplary embodiments of the present disclosure will be described by way of example, with reference to the accompanying drawings in which.

DETAILED DESCRIPTION OF THE PREFERRED EMBODIMENTS

First Embodiment

Figure 1A:
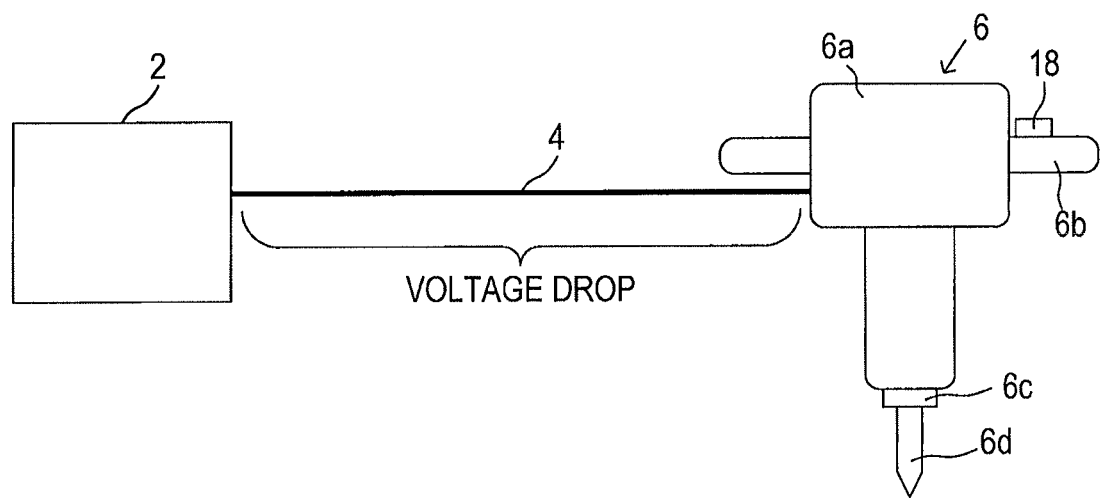
FIGS. 1A and 1B are explanatory diagrams for explaining a voltage drop caused in a power supply path to an electric working machine.
Figure 1B:
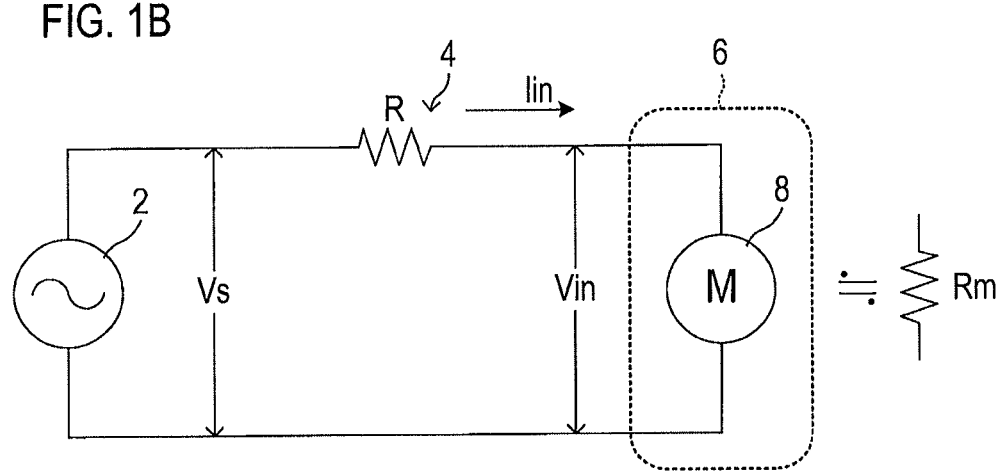
Figure 2A:
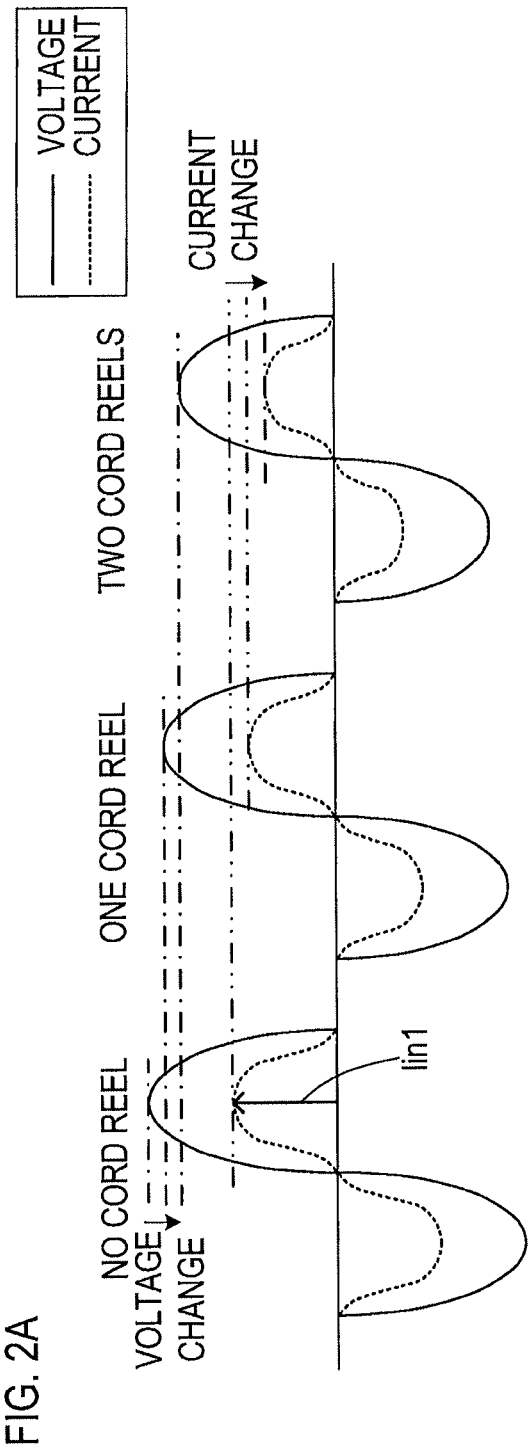
FIG. 2A is a diagram showing voltage and current changes caused by presence or absence of a cord reel during no-load operation of the motor.
Figure 2B:
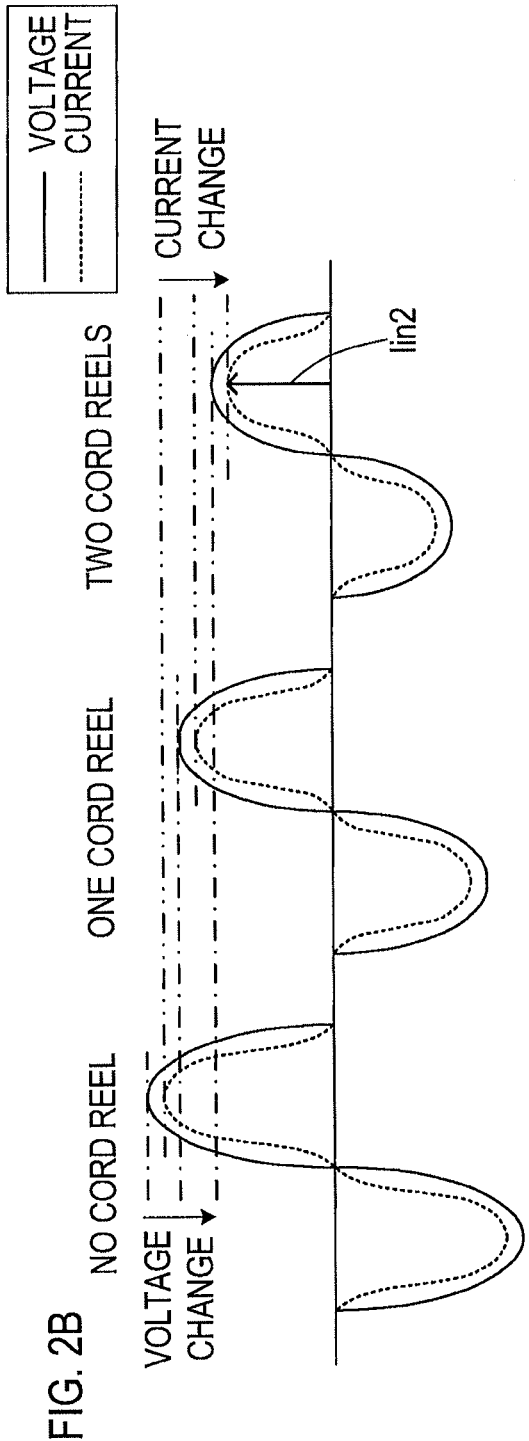
FIG. 2B is a diagram showing voltage and current changes caused by presence or absence of a cord reel during load operation of the motor.
Figure 3:
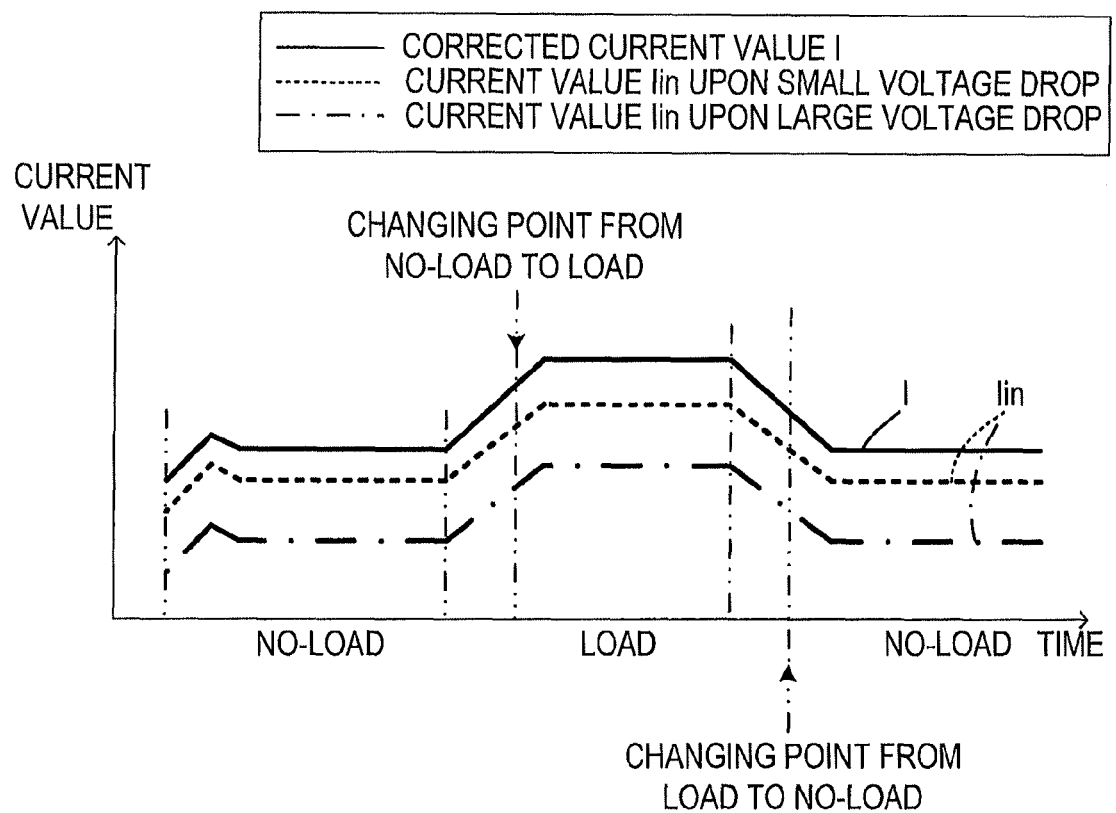
FIG. 3 is an explanatory diagram for explaining current changes caused by the voltage drop in the power supply path and a correcting operation of its current value.

An electric working machine 6 of the present embodiment, similar to the electric working machine illustrated in FIG. 1, is an impact tool such as an electric hammer comprising a housing 6a, a pair of grippers 6b, a mount 6c configured to be able to mount a tool bit 6d, and an operation switch 18. A motor 8 and a driving force transmission mechanism (not shown) are provided in the housing 6a. For example, the mount 6c is removably coupled to the tool bit 6d. The mount 6c is directly or indirectly driven by the motor 8 to drive the mounted tool bit 6d.

Figure 4:
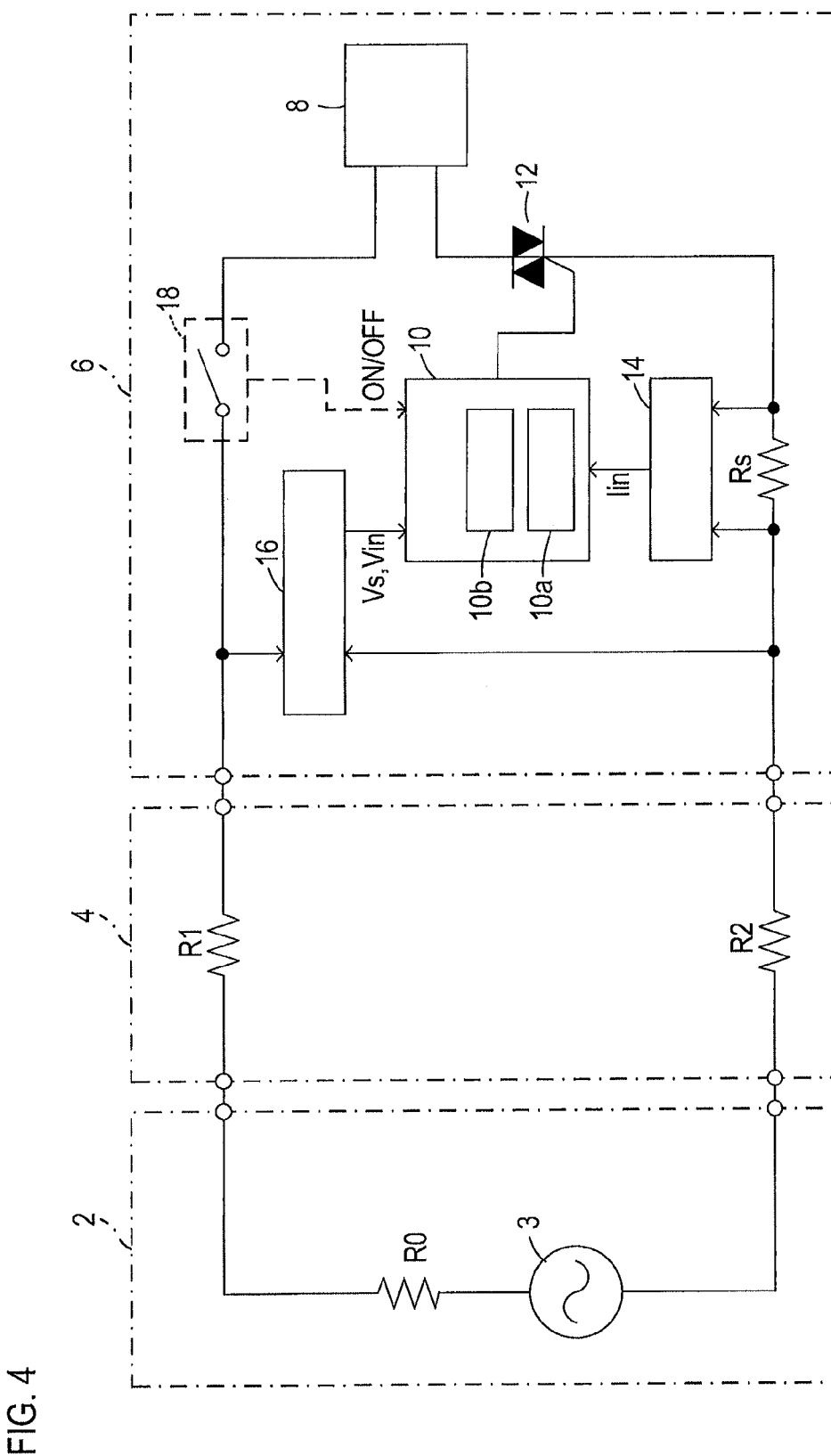
FIG. 4 is a diagram showing a configuration of an electric working machine according to a first embodiment and a power supply system to the electric working machine.

As shown in FIG. 4, the electric working machine 6 of the embodiment utilizes as an electric power source 2 an alternate current (AC) power source 3 that is a commercial power source or a generator. The electric power source 2 is coupled to the electric working machine 6 via a power cord 4.

In FIG. 4, a resistance R0 of the electric power source 2 represents an internal resistance of the electric power source 2. Resistors R1, R2 in the power cord 4 represent internal resistances of the power cord 4. Specific examples of the internal resistance R0 of the electric power source 2 can include an internal resistance of the generator itself, an internal resistance of a power line or house wiring for electric power transmission of the commercial power source, and so on.

The operation switch 18 is provided in one of a pair of current paths that connects the power cord 4 and the motor 8. The operation switch 18 can be operated by a user to directly complete/interrupt the current path.

In the other of the pair of current paths, a triac 12 is provided to complete/interrupt the current path to control a current flowing through the motor 8, and also a current detection resistor Rs is provided to detect the current flowing through the current path (in other words, the motor 8).

Both ends of the current detection resistor Rs are coupled to a current detection circuit 14. The current detection circuit 14 detects a current Iin flowing through the motor 8 from a voltage between the both ends of the current detection resistor Rs.

Also, in the electric working machine 6, an input voltage detection circuit 16 for detecting an input voltage Vin from the power cord 4 is provided closer to the power cord 4 (in other words, the electric power source 2) than the operation switch 18, the triac 12 and the current detection resistor Rs on the pair of current paths connected to the power cord 4.

Detection signals from the input voltage detection circuit 16 and the current detection circuit 14 are input to a control unit 10.

The control unit 10 is configured to control a current supplied to the motor 8 (in other word, driving power of the motor 8) via the triac 12. The control unit 10 is configured by a microcomputer having an arithmetic unit 10a and a storage unit 10b. For example, the arithmetic unit 10a comprises a CPU and the like. The storage unit 10b comprises a ROM, a RAM, and the like. The control unit 10 may be implemented by an ASIC (Application Specified Integrated Circuit) or by a programmable logic device such as FPGA (Field Programmable Gate Array), or may be implemented by a combination thereof.

Figure 5:
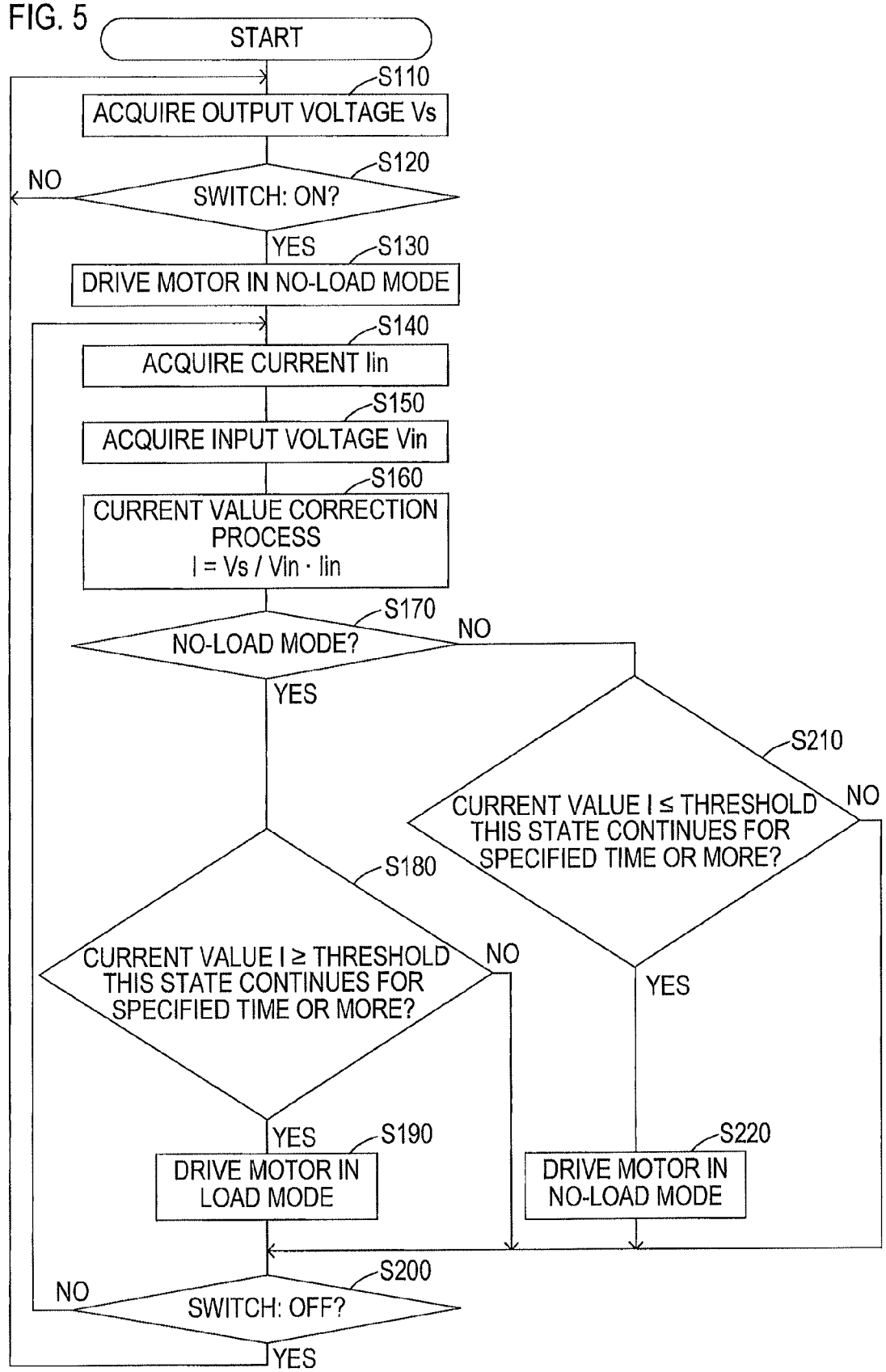
FIG. 5 is a flowchart showing a motor drive control process executed by a control unit.

The arithmetic unit 10a executes a motor drive control process shown in FIG. 5. By execution of the motor drive control process, the control unit 10, when the operation switch 18 is turned on, determines whether the motor 8 is driven at no-load, and controls the current (driving power) supplied to the motor 8.

This motor drive control process will be described in the following. The motor drive control process is repeatedly executed by the control unit 10, when the electric working machine 6 is coupled to the electric power source 2 via the power cord 4 and when a power supply circuit (not shown) of the electric working machine 6 receives the power supplied from the electric power source 2 to supply a power supply voltage (direct current (DC) constant voltage) to the control unit 10.

As shown in FIG. 5, the control unit 10, when the motor drive control process is started, first acquires from the input voltage detection circuit 16 an output voltage Vs from the electric power source 2 in S110 (S denotes a step).

Immediately after the motor drive control process is started, the operation switch 18 is OFF and no current for driving the motor 8 is flowing to the power cord 4. Therefore, in S110, a detection voltage by the input voltage detection circuit 16 is acquired as the output voltage Vs from the electric power source 2.

In subsequent S120, it is determined whether the operation switch 18 is ON. If the operation switch 18 is not ON, the control unit 10 makes a negative determination in S120, and shifts the process to S110 again to monitor the output voltage Vs from the electric power source 2.

When it is determined in S120 that the operation switch 18 is ON, the control unit 10 drives the motor 8 in no-load mode via the triac 12.

That is, in S130, the motor 8 is deemed to be in a no-load state. The current supplied to the motor 8 is controlled via the triac 12 so that the driving power of the motor 8 (in other words, electric power applied to the motor 8) is equal to an amount of power set in advance for no-load operation (low electric power).

After the motor 8 is started driven in no-load mode as above in S130, the current Iin during drive of the motor 8 is acquired from the current detection circuit 14 in subsequent S140. In S150, the input voltage Vin during drive of the motor 8 is acquired from the input voltage detection circuit 16.

In S160, based on the output voltage Vs from the electric power source 2 acquired when the motor 8 is not driven in S110 and the current Iin and the input voltage Vin acquired in S140 and S150, a current value I at the time when it is assumed that internal resistances of R0, R1, R2 of the electric power source 2 and the power cords 4 are zero is calculated.

That is, in S160, using the above-mentioned arithmetic equation (5) or a map set based on the arithmetic equation (5), the current value I at the time when it is assumed that the internal resistances R0, R1 and R2 of the electric power source 2 and the power cords 4 are zero and there is no voltage drop due to the internal resistances R0, R1 and R2 is calculated from the current Iin during drive of the motor 8 that has been detected by the current detection circuit 14.

In subsequent S170, the control unit 10 determines whether the motor 8 is currently driven in no-load mode. If the motor 8 is driven in no-load mode, the process proceeds to S180.

In S180, the control unit 10 determines whether the current value I calculated in S160 is equal to or more than a load determination threshold preset for determining load operation of the motor 8, and whether its state has continued for a preset specified time or more.

If the current value I is equal to or more than the load determination threshold and the state continues for the specified time or more, the process proceeds to S190. Drive mode of the motor 8 is changed from no-load mode to load mode in S190. In S190, the drive mode of the motor 8 is switched to load mode so as to increase the driving power of the motor 8 from low electric power during no-load operation to the driving power during load operation.

As a result, a rotational torque of the motor 8 increases. An external load can be appropriately driven.

In S190, when the drive mode of the motor 8 is changed to load mode, the process proceeds to S200. Alternatively, when it is determined in S180 that the current value I is less than the load determination threshold, or the state in which the current value I is equal to or more than the load determination threshold has not continued more than the specified time, the process proceeds to S200.

The control unit 10, when it is determined in S170 that the motor 8 is not driven in no-load mode (in other words, it is driven in load mode), the process proceeds to S210.

In S210, it is determined whether the current value I calculated in S160 is equal to or less than a no-load determination threshold preset for determining the no-load operation of the motor 8, and whether its state has continued for a preset specified time or more.

The no-load determination threshold is set to be less than the load determination threshold used in S180. This is to inhibit the drive mode of the motor 8 from being switched frequently.

In S210, if it is determined that the current value I is equal to or less than the no-load determination threshold, and that the state has continued for more the specified time or more, the control unit 10 proceeds to S220 to change the drive mode of the motor 8 from load mode to no-load mode.

In S220, the drive mode of the motor 8 is switched to no-load mode to reduce the driving power of the motor 8 to low electric power for no-load operation.

As a result, the motor 8 is driven in the no-load operation at low rotation speed.

In S220, when the drive mode of the motor 8 is changed to no-load mode, the process proceeds to S200. Alternatively, when it is determined in S210 that the current value I is more than the no-load determination threshold, or the state in which the current value I is equal to or less than the no-load determination threshold has not continued for the specified time or more, the process proceeds to S200.

In S200, it is determined whether the operation switch 18 is OFF. If the operation switch 18 is not OFF, the process proceeds to S140 again to execute the process of S140 and the subsequent steps.

In S200, if it is determined that the operation switch 18 is OFF, the process proceeds to S110 to execute the process of S110 and the subsequent steps.

As described above, in the motor drive control process, the current Iin flowing at the time when the operation switch 18 is ON is corrected based on a ratio (Vs/Vin) between the input voltage Vin to the motor 8 and the output voltage Vs from the electric power source 2. Using the corrected current value I, whether the motor 8 is in the no-load operation is determined.

Thus, according to the electric working machine 6 of the present embodiment, it is possible to accurately determine the no-load operation of the motor 8, regardless of a change of the length of the power cord 4 due to the cord reel or the like for extension. Therefore, it is possible to properly carry out the motor drive control based on the determination result.

Further, in the motor drive control process, the input voltage Vin to the motor 8 is acquired from the input voltage detection circuit 16 when the operation switch 18 is ON, and the output voltage Vs from the electric power source 2 is acquired from the input voltage detection circuit 16 when the operation switch 18 is OFF.

Therefore, not only the input voltage Vin to the motor 8 but also the output voltage Vs from the electric power source 2 can be detected using the input voltage detection circuit 16. Thus, the current Iin can be accurately corrected to the current value I at the time when it is assumed that the internal resistances R0, R1 and R2 of the electric power source 2 and the power cords 4 are zero.

In this embodiment, the current detection circuit 14 corresponds to an example of a current detector of the present disclosure. The input voltage detection circuit 16 corresponds to an example of a voltage detector of the present disclosure. The control unit 10 corresponds to an example of a load state determination unit and a motor control unit.

The process of S110 to S170 in the motor driving process executed by the control unit 10 corresponds to an example of a process executed by the load state determination unit of the present disclosure. The process of S180 to S220 corresponds to an example of a process executed by the motor control unit of the present disclosure.

As described above, in this embodiment, the detection voltage is acquired from the input voltage detection circuit 16 when the operation switch 18 is the OFF. Thereby, the output voltage Vs from the AC power source 3 of the electric power source 2 is detected. However, it is not always necessary to detect the output voltage Vs. In other words, a rated output voltage of a generator or a commercial power source may be utilized as the output voltage Vs.

In this case, the output voltage Vs can be stored in the storage unit 10b. In S110 of the motor drive control process of FIG. 5, the control unit 10 can read the output voltage Vs from the storage unit 10b.

Second Embodiment

Figure 6:
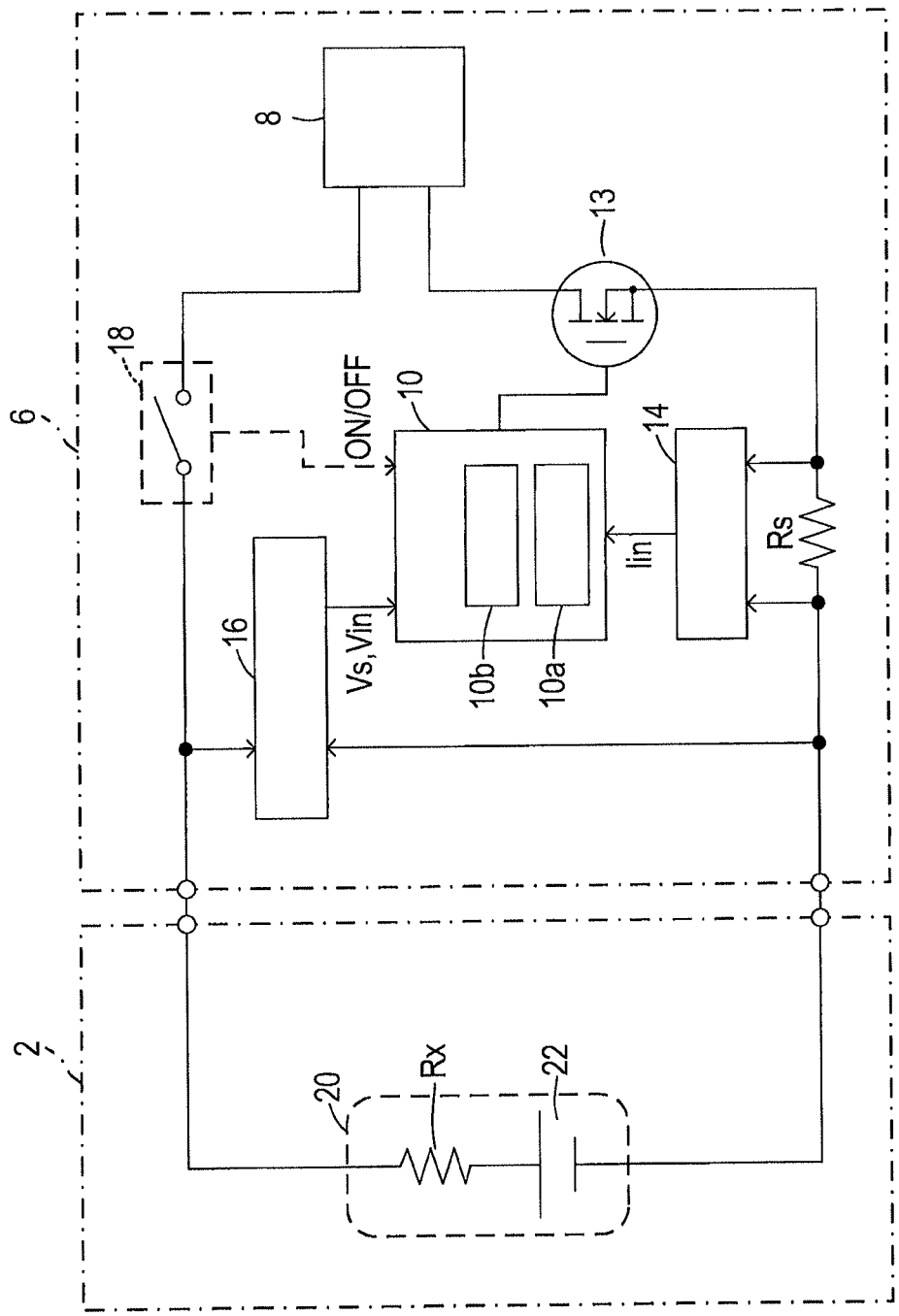
FIG. 6 is a diagram showing a configuration of an electric working machine according to a second embodiment and a power supply system to the electric working machine.

As shown in FIG. 6, the electric working machine 6 of the present embodiment is an electric working machine of direct current (DC) drive system that operates by receiving a supply voltage (DC) from the electric power source 2 with a battery 20 that can be mounted on a machine body.

In the electric working machine 6, the motor 8 comprises a DC motor. In place of the triac 12 in the first embodiment, a MOSFET 13 is provided as a switching element provided in the current path to the motor 8.

Except for the point described above, the electric working machine 6 of the present embodiment is configured in the same manner as in the first embodiment. Thus, detailed description thereof is omitted.

The battery 20 of the power source 2 is mounted on a main body of the electric working machine 6. Thus, the power supply path from the electric power source 2 to the electric working machine 6 is short. The length thereof does not change like the power cord 4 that can be extended by a cord reel and the like.

However, the battery 20 may be degraded by being repeatedly charged and discharged. An internal resistance Rx shown in FIG. 6 may increase.

Therefore, the input voltage Vin to the electric working machine 6 during drive of the motor 8 becomes lower than the output voltage Vs from a cell 22 of the battery 20 by a voltage drop due to the internal resistance Rx. Moreover, the input voltage Vin varies depending on a degree of deterioration of the battery 20.

Therefore, in a case of using the battery 20 as the power source 2, it is not possible to accurately determine the no-load operation of the motor 8 only by the current Iin detected by the current detection circuit 14, even if there is no power cord 4.

Therefore, in this embodiment as well, the control unit 10 executes the motor drive control process of FIG. 5 as in the first embodiment.

That is, the control unit 10 corrects the current Iin during drive of the motor 8, in accordance with the ratio (Vs/Vin) between the input voltage Vin during drive of the motor 8 and the output voltage Vs from the battery 20 (more specifically, the cell 22), and determines whether the motor 8 is in the no-load operation from the corrected current value I.

Therefore, even in the electric working machine 6 of the present embodiment, it is possible to achieve the same effect as in the first embodiment.

Third Embodiment

Figure 7:
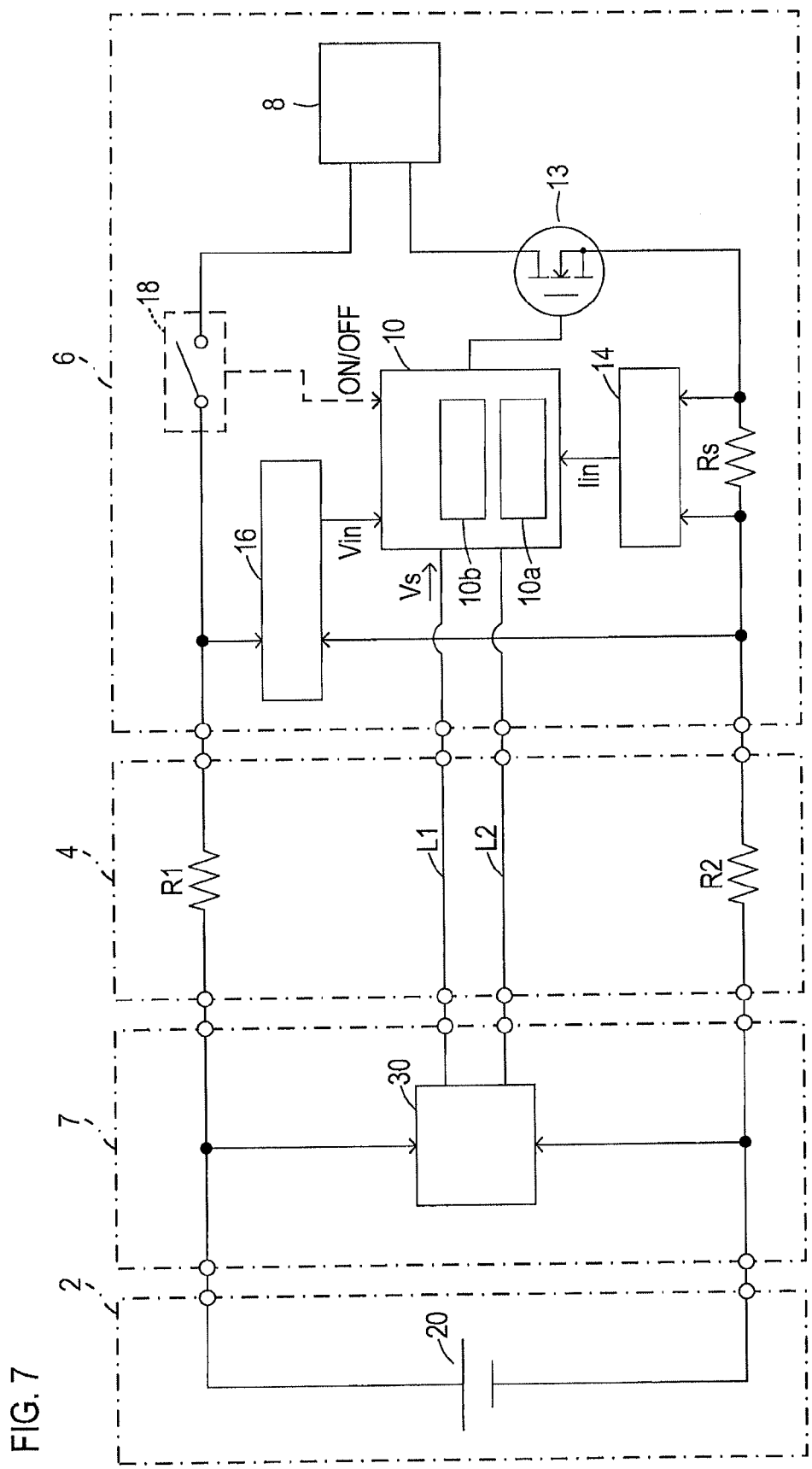
FIG. 7 is a diagram showing a configuration of an electric working machine according to a third embodiment and a power supply system to the electric working machine.

As shown in FIG. 7, the electric working machine 6 according to the present embodiment, similar to that described in the second embodiment, is an electric working machine of DC drive system. The electric working machine 6 is coupled to the electric power source 2 with the battery 20 via the power cord 4 and a battery adapter 7.

The battery adapter 7 is for connecting the power cord 4 to the battery 20. Inside the battery adapter 7, a control circuit 30 is provided for detecting and transmitting the output voltage Vs of the battery 20 to the control unit 10 of the electric working machine 6.

The power cord 4 is provided with communication paths L1, L2 for transmitting and receiving information such as the output voltage Vs between the control circuit 30 and the control unit 10, in addition to the power supply path having the internal resistances R1, R2 for supplying DC power from the electric power source 2 to the electric working machine 6.

The control unit 10 of the electric working machine 6, similar to each of the above-described embodiments, executes the motor drive control process of FIG. 5, but acquires the output voltage Vs from the control circuit 30 in the battery adapter 7 in S110.

Therefore, even in the electric working machine 6 of the present embodiment, it is possible to achieve the same effect as in the above embodiments. The control circuit 30 in the battery adapter 7 corresponds to an output voltage detector of the present disclosure.

In this embodiment, since the control unit 10 acquires from the control circuit 30 in the battery adapter 7 the output voltage Vs, the control unit 10 can acquire the output voltage Vs even during drive of the motor 8.

As in the present embodiment, if the control unit 10 acquires from the output voltage detector outside the electric working machine 6 the output voltage Vs, the output voltage Vs can be acquired without the operation switch 18 provided in the electric working machine 6.

Figure 8:
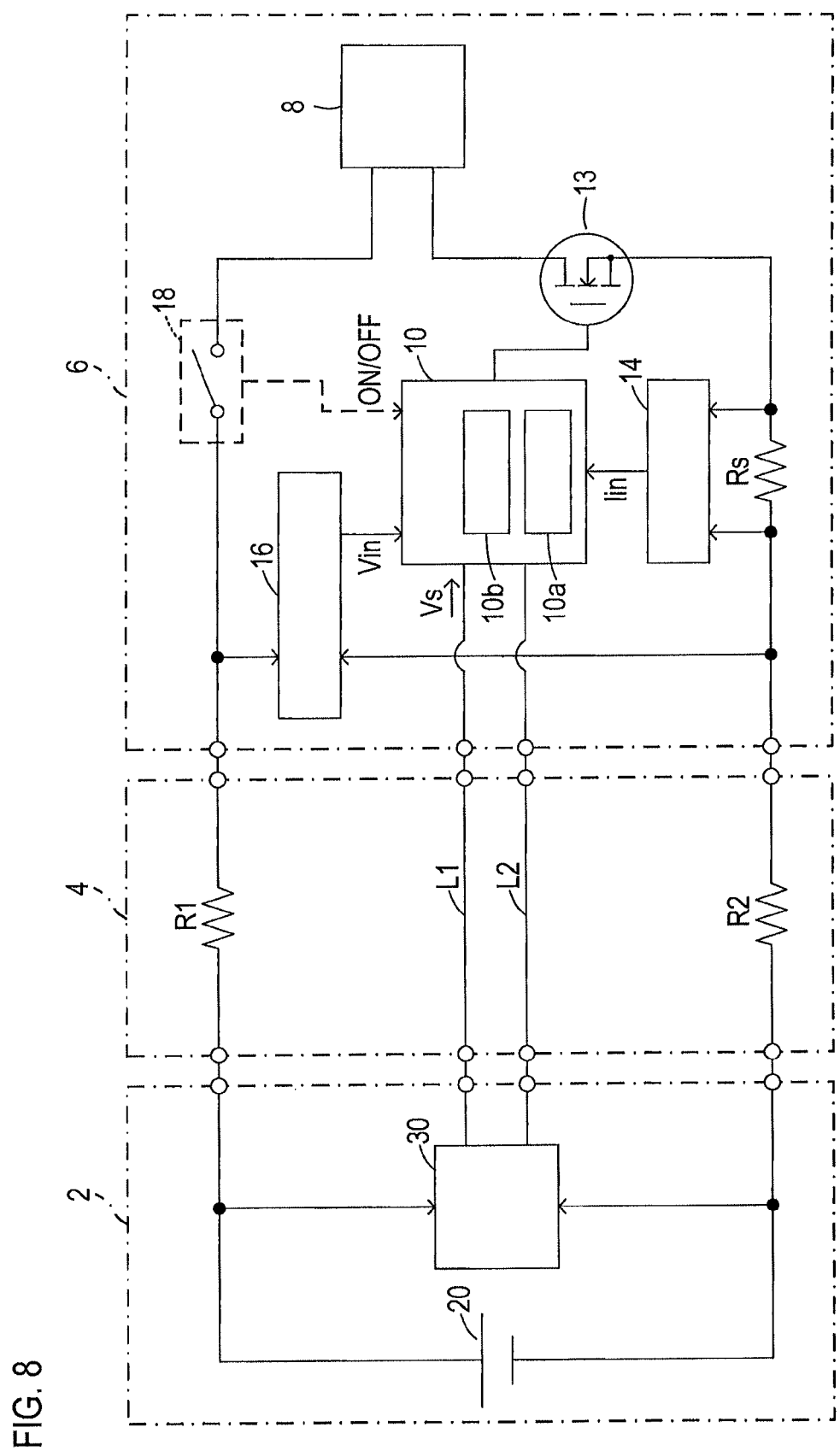
FIG. 8 is a block diagram showing a configuration of a modification of the third embodiment.

In the embodiment shown in FIG. 7, the control circuit 30 for detecting the output voltage Vs is provided in the battery adapter 7. However, as shown in FIG. 8, the output voltage detector (control circuit 30) may be provided in the battery 20 of the electric power source 2.

In the embodiment provided with the output voltage detector in the battery 20, it is possible to directly acquire from the battery 20 the output voltage Vs of the electric power source 2 and correct the current Iin to the current value I at the time when there is no voltage drop in the power supply path, even in the electric working machine that does not use the battery adapter 7.

The embodiments of the present disclosure have been described in the above. However, the present disclosure is not intended to be limited to the above embodiments and can take various forms within the scope not departing from the gist of the present disclosure.

For example, the electric working machine 6 is not limited to an impact tool. The present disclosure may be applied, similar to the above embodiments, to an electric working machine configured to receive AC power or DC power from the electric power source 2 and drive the motor 8 by the received electric power. This electric working machine produces the same effects as the electric working machine 6.

The electric working machine of the present disclosure may be electric power tools for masonry, metalwork, woodwork, horticulture, and the like. More specifically, the present disclosure can be applied to electric working machines, such as electric hammers, electric hammer drills, electric drills, electric screwdrivers, electric wrenches, electric grinders, electric circular saws, electric reciprocating saws, electric jigsaws, electric cutters, electric chain saws, electric planers, electric nailing machines (including tackers), electric hedge trimmers, electric lawnmowers, electric lawn clippers, electric brush cutters, electric cleaners, electric blowers, etc.

Among these electric working machines, electric cleaners and electric blowers are for sucking or blowing air. In an electric cleaner and an electric blower, a fan rotatably driven by a motor corresponds to an example of the tool bit. A structure for mounting the fan to a rotating shaft of the motor corresponds to an example of the mount.

What is claimed is:

1. An electric working machine comprising:
   a housing;
   a mount configured to mount one of a tool bit and an edged tool for carrying out work to a workpiece;
   a motor that is built in the housing and configured to be driven by electric power supplied from an electric power source to drive the mount;
   an operation switch for driving the motor;
   a current detector configured to detect a current flowing through the motor during drive of the motor in association with an operation of the operation switch;
   a voltage detector configured to detect an input voltage supplied to the motor during drive of the motor; and
   a load state determination unit configured to determine whether the motor is in a no-load operation state in which no work is carried out to the workpiece during drive of the motor, based on the current detected by the current detector, the input voltage detected by the voltage detector, and an output voltage from the electric power source,
   wherein the load state determination unit is configured to correct a value of the detected current in accordance with a ratio (Vs/Vin) between the output voltage (Vs) and the input voltage (Vin), and determine whether the motor is in the no-load operation state on the basis of a current value after the correction.

2. The electric working machine according to claim 1, wherein the load state determination unit is configured to determine that the motor is in the no-load operation state when the current value after the correction is equal to or less than a preset threshold for no-load determination.

3. The electric working machine according to claim 1, wherein the load state determination unit is configured to acquire the output voltage from the electric power source via the voltage detector when the motor is not driven.

4. The electric working machine according to claim 3, wherein:
   the operation switch is provided closer to the motor than a connecting section to the voltage detector in a current path to the motor, and is configured to complete/interrupt the current path,
   the load state determination unit is configured to acquire the input voltage from the voltage detector when the operation switch is ON, and the output voltage from the voltage detector when the operation switch is OFF.

5. The electric working machine according to claim 1, wherein the load state determination unit is configured to acquire the output voltage from an output voltage detector, and the output voltage detector is provided in one of the electric power source and a power supply path from the electric power source to the electric working machine.

6. The electric working machine according to claim 1, further comprising:
   a motor control unit configured to increase driving power of the motor, when it detects that the motor has changed its operation state from the no-load operation state to a load operation state based on a determination result of the load state determination unit.

7. An electric working machine comprising:
   a housing;
   a mount configured to mount one of a tool bit and an edged tool for carrying out work to a workpiece;
   a motor that is built in the housing and configured to be driven by electric power supplied from an electric power source to drive the mount;
   an operation switch for driving the motor;
   a current detector configured to detect a current flowing through the motor during drive of the motor in association with an operation of the operation switch;
   a voltage detector configured to detect an input voltage supplied to the motor during drive of the motor; and
   a load state determination unit configured to determine whether the motor is in a no-load operation state in which no work is carried out to the workpiece during drive of the motor, based on the current detected by the current detector, the input voltage detected by the voltage detector, and an output voltage from the electric power source,
   wherein:
      the operation switch is provided closer to the motor than a connecting section to the voltage detector in a current path to the motor, and is configured to complete/interrupt the current path, and
      the load state determination unit is configured to acquire the input voltage from the voltage detector when the operation switch is ON, and the output voltage from the voltage detector when the operation switch is OFF and the motor is not driven.

* * * * *